(No Model.)
J. E. EVANS.
VELOCIPEDE.
No. 385,258. Patented June 26, 1888.
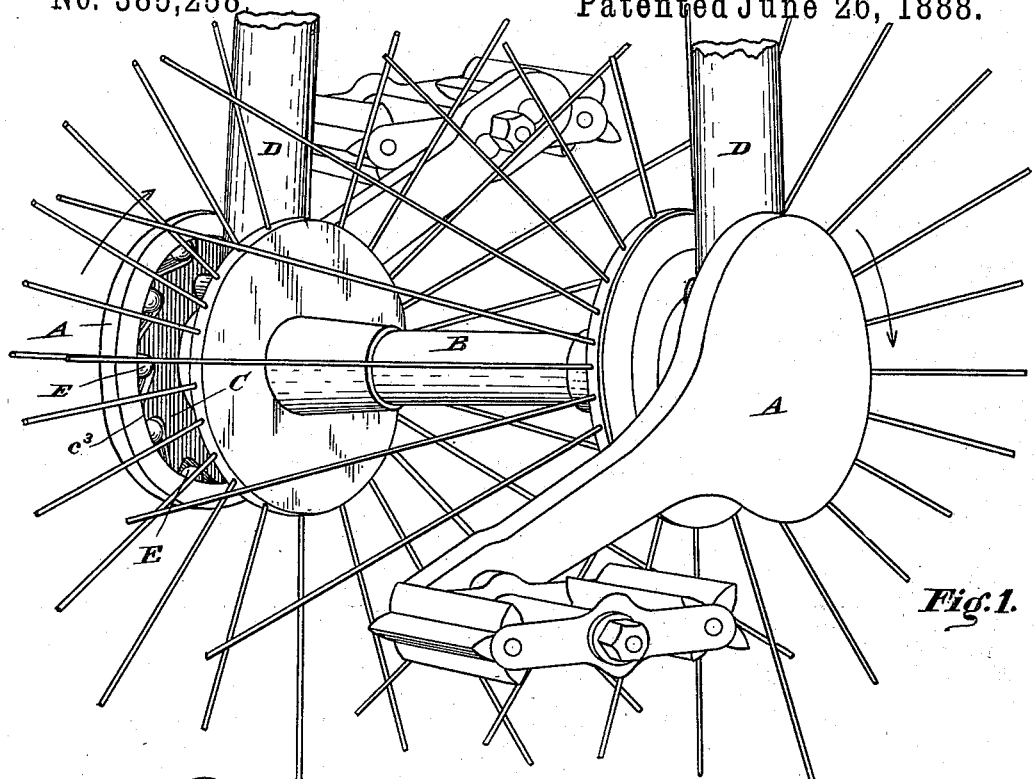
Fig. 1.
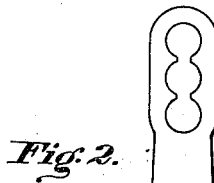
Fig. 2. Fig. 3.
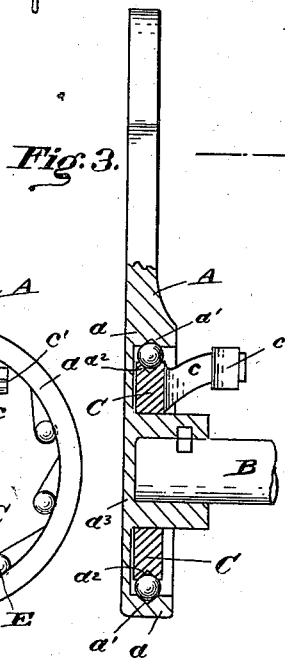
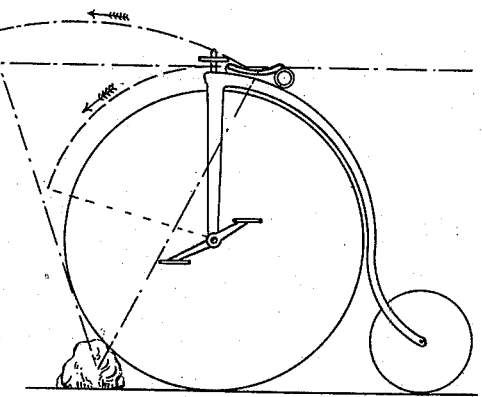
Fig. 4.
Attest.
C. W. Bogart.
Harvey Ritchie.
Inventor.
James E. Evans
per Strehli & Hill
Attys.

UNITED STATES PATENT OFFICE.

JAMES E. EVANS, OF CINCINNATI, OHIO.

VELOCIPEDE.

SPECIFICATION forming part of Letters Patent No. 385,258, dated June 26, 1888.

Application filed March 15, 1888. Serial No. 267,211. (No model.)

*To all whom it may concern:*

Be it known that I, JAMES E. EVANS, a citizen of the United States, and a resident of Cincinnati, Hamilton county, Ohio, have invented certain new and useful Improvements in Ball-Bearing Anti-Headers for Bicycles, of which the following is a specification.

The object of my invention is to provide a device which may be attached to any of the ordinary forms of bicycles to prevent the rider from taking what is termed a "header" when the main wheel strikes an obstruction.

In the accompanying drawings, Figure 1 is a perspective view of a bicycle shaft and cranks, on an enlarged scale, showing my improved anti-header in position. Fig. 2 is a view in elevation of the inner face of one of the cranks provided with my device, showing one form of toothed disk and balls in position in the countersunk portion of said crank. Fig. 3 is a vertical central section taken through said crank and disk. Fig. 3 is a view in elevation of a bicycle, on a diminished scale, when striking an obstruction, the dotted lines showing the center of gravity changed from the shaft (as is the case when not provided with an anti-header) to the obstruction, as is the case when provided with my improved anti-header.

My invention consists in attaching to the cranks of a bicycle a device in the nature of a ball-clutch, and is constructed and operated in the following preferable manner:

Each of the cranks A is rigidly connected in any suitable manner to the shaft B. In the present illustrative instance they are attached thereto by having the stationary journals of the cranks keyed to the outer ends of said shaft, as shown in Fig. 3. The inner face of the circular portion of each of the cranks is countersunk, leaving an outer casing, $a^3$, and a circular wall, $a$. In the countersunk portion of each of the cranks the toothed disk C is secured in the following preferable manner:

To the inner face of each of the disks C is cast or suitably secured two lugs, $c$, sufficiently far apart as to accommodate varying widths of forks. When the cranks are put to place on the shaft, the forked portions D will fit in between these lugs $c$. When in this position, the screw $c'$, having a flanged cap, $c^2$, on its end portion, is screwed through one of the lugs up and against one side of the fork, thus rigidly connecting said disks C to the forks D without marring the latter.

Around the inner face of the wall $a$ on each of the cranks is made a groove, $a'$, and in the outer face of the toothed disks C is made a corresponding groove, $a^2$. These grooves are made of sufficient depth to accommodate about one-third the diameter, respectively, of the balls E. The vertical portion $c^3$ of the teeth on the disks is of sufficient height to permit the balls to revolve freely in the angular grooved portions of the teeth when the cranks are operated in a direction toward the vertical portions $c^3$, as shown by the arrow in Fig. 1. It will be seen that by the above construction a ball-bearing is afforded for the cranks, which revolve around the disks C, the latter being made stationary to the forks D, as afore described.

The balls E are kept in place by securing in any suitable manner a thin circular piece of fiber or other material over the disks in the countersunk portions.

The operation of the device as an anti-header which acts in the nature of a ball-clutch is as follows: The toothed disks C, being rigidly connected to the forks D, permit of the cranks being operated freely in a forward direction, as indicated by the arrow in Fig. 1; but no backward motion of the cranks nor forward motion of the forks is permitted, for the reason that as soon as either movement is accomplished the balls E impinge against the angular surface portions $c^4$ of the teeth on the disks and securely lock the cranks and disks, the latter being secured stationary to the forks D of the bicycle. This latter is the principal feature of my invention, and to those accustomed to riding bicycles will at once commend itself. In the ordinary bicycle not provided with an anti-header great danger is incurred by reason of obstructions in the way of the main wheel. When the wheel strikes an obstruction and is brought to a standstill, the forward momentum of the rider is apt to carry him past the center of gravity (which is the shaft of the wheel) and cause him to take a header, often severely injuring him. My invention greatly lessens, if not entirely obviates, this danger. When provided with my improved anti-header, so soon as the wheel strikes an obstruction and stops the forward momentum of the rider causes the forks to move forward, and with them the disks C. This forward motion of the disks causes the balls E to act at once and impinge against the angular portion $c^4$ of the teeth on the disks and lock the same, as afore described. When the main wheel strikes an obstruction, this locking of the disks and cranks by reason of the forward momentum of the rider causes the center of gravity to be shifted from the shaft (which is the center of gravity when not provided with an anti-header) to the obstruction, as is illustrated by dotted lines in Fig. 4. This shifting of the center of gravity from the shaft to the obstruction necessitates the raising of the rider, a new circle being described, and also necessitates carrying him farther before he can possibly take a header. It will be seen that the weight of the rider very materially assists to prevent accident.

The disks C will be operative in the cranks without the use of the grooves $a'$ and $a^2$, although it is preferred to provide said grooves. If desired, but one anti-header need be employed; but it is preferred to use two—one in each crank.

While the means shown for connecting the crank to the shaft and the disk to the fork is preferably employed, any suitable means may be employed for making said connections.

What I claim as new and of my invention, and desire to secure by Letters Patent, is—

1. An anti-header for bicycles, consisting of a ball-clutch or lock located in the cranks, said ball-clutch or lock being rigidly connected to the fork of the bicycle, substantially as set forth.

2. An anti-header for bicycles, consisting of a crank circularly countersunk on its inner face, in combination with a suitable toothed disk in said countersunk portion and balls interposed between the outer wall of the countersunk portion of the crank and the toothed disk, the latter being rigidly attached to the fork of the bicycle, substantially as described.

3. An anti-header for bicycles, consisting of a circularly-countersunk crank, A, having an outer circular wall, $a$, said wall having a groove, $a'$, therein, in combination with a toothed disk, C, having a groove, $a^2$, in its outer face, and suitable balls interposed in said grooves between said wall and disk, the latter being attached to the fork of the bicycle, substantially as set forth.

4. The cranks A, rigidly connected to shaft B, said cranks being circularly countersunk on their inner faces, in combination with circularly-toothed disks C in said countersunk portions, and balls E, interposed between walls $a$ and the disks C, lugs $c$, attached to said disks, and screws $c'$, substantially as set forth.

JAMES E. EVANS.

Witnesses:
E. S. HAVENS,
JOSEPH MORRISON.